No. 624,908. Patented May 16, 1899.
J. W. CONCHAR.
TOOL BRACKET.
(Application filed Aug. 23, 1898.)
(No Model.)
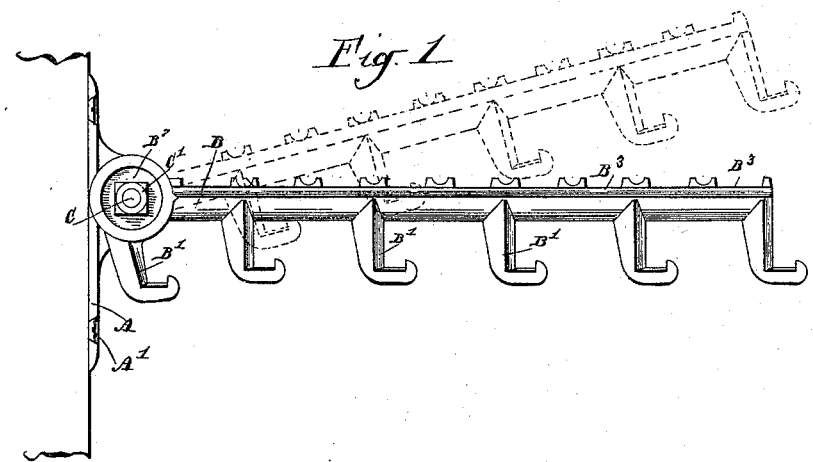
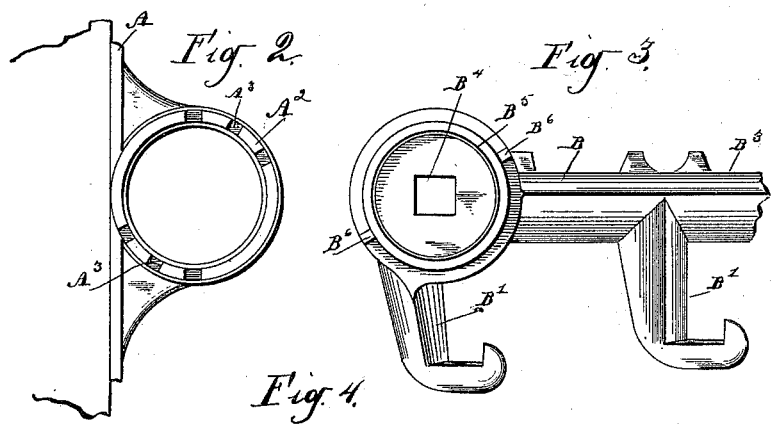
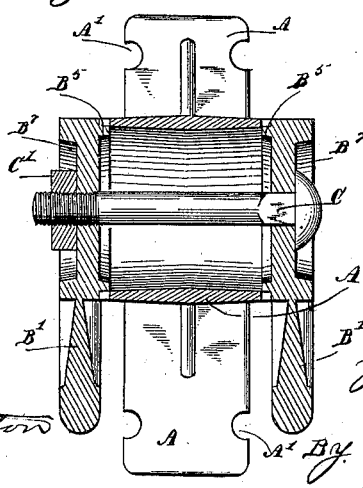
Attest:
J. F. Groat
N. H. Burton
Inventor
James W. Conchar
By J. M. St. John
Atty.

UNITED STATES PATENT OFFICE.

JAMES W. CONCHAR, OF DUBUQUE, IOWA.

TOOL-BRACKET.

SPECIFICATION forming part of Letters Patent No. 624,908, dated May 16, 1899.

Application filed August 23, 1898. Serial No. 689,363. (No model.)

*To all whom it may concern:*

Be it known that I, JAMES W. CONCHAR, a citizen of the United States, residing at Dubuque, in the county of Dubuque and State of Iowa, have invented certain new and useful Improvements in Tool-Brackets; and I do hereby declare the following to be a full, clear, and exact description of the invention, such as will enable others skilled in the art to which it appertains to make and use the same.

This invention relates to brackets such as are used for holding tools—such as shovels, rakes, and the like—in stores and warehouses; and the object of this invention is to produce a cheap and simple double-arm bracket which may be easily adjusted to any desired angle.

The peculiar features of the invention will be fully hereinafter set forth and claimed, reference being had to the accompanying drawings, forming a part of this specification, in which—

Figure 1 is a side elevation of a device embodying my invention. Fig. 2 is a similar view of the wall-plate of the same. Fig. 3 is a view from the inner side of the end of one of the bracket-arms which is connected to the wall-plate. Fig. 4 is a section through the center of the bracket connection with the wall-plate, looking toward the wall.

Similar letters of reference indicate corresponding parts.

In the drawings, A is a wall-plate provided with suitable openings A' to receive fastening-screws by which it is attached to a wall or post. Projecting forward from the base of the plate is a hollow cylindrical hub $A^2$, each side of which is notched at $A^3$ to receive corresponding lugs formed on the hub of the bracket-arm B. Two arms are provided for the bracket, which arms have depending hooks B', adapted to support such articles as garden-rakes and the like, and notches on the upper side to take the blades of shovels and other like tools each side of the handle. The wider spaces $B^8$ serve for the wider edges of spades. The bracket-arm hub has a central bolt-hole $B^4$ and a little distance from the edge an annular rib $B^5$ fitting neatly inside the wall-plate hub. Outside this rib and opposite each other are lugs $B^6$, adapted to engage the notches in the hub of the wall-plate. A recess $B^7$ on the outer side of the bracket-arm hub takes the head of a bolt C and the nut C', by which the two bracket-arms and the wall-plate are fastened together. The arms of the bracket are adjustable to any desired angle by loosening the nut, moving the arms to the required position, and retightening the nut.

Having thus described my invention, what I claim as new, and desire to secure by Letters Patent, is—

A tool-bracket consisting of a wall-plate adapted for attachment to a wall or post, and having a cylindrical hub notched at opposite points on its periphery, and at various radial angles, and a pair of bracket-arms having depending hooks, and notches above, and hubs provided with annular flanges fitting the inside of the wall-plate hub, and lugs to engage the notches therein, central bolt-holes, and a bolt adapted to clamp the arms to the wall-plate, substantially as described.

In testimony whereof I affix my signature in presence of two witnesses.

JAMES W. CONCHAR.

Witnesses:
 G. H. RUTHOP,
 WALTER SCHREIBER.